Jan. 24, 1967  M. BOUCRAUT ET AL  3,299,947

HEAT TRANSFER APPARATUS

Filed May 11, 1964  3 Sheets-Sheet 1

Inventors
Michel Boucraut
Imre Toth
by Michael J. Striker
Atty.

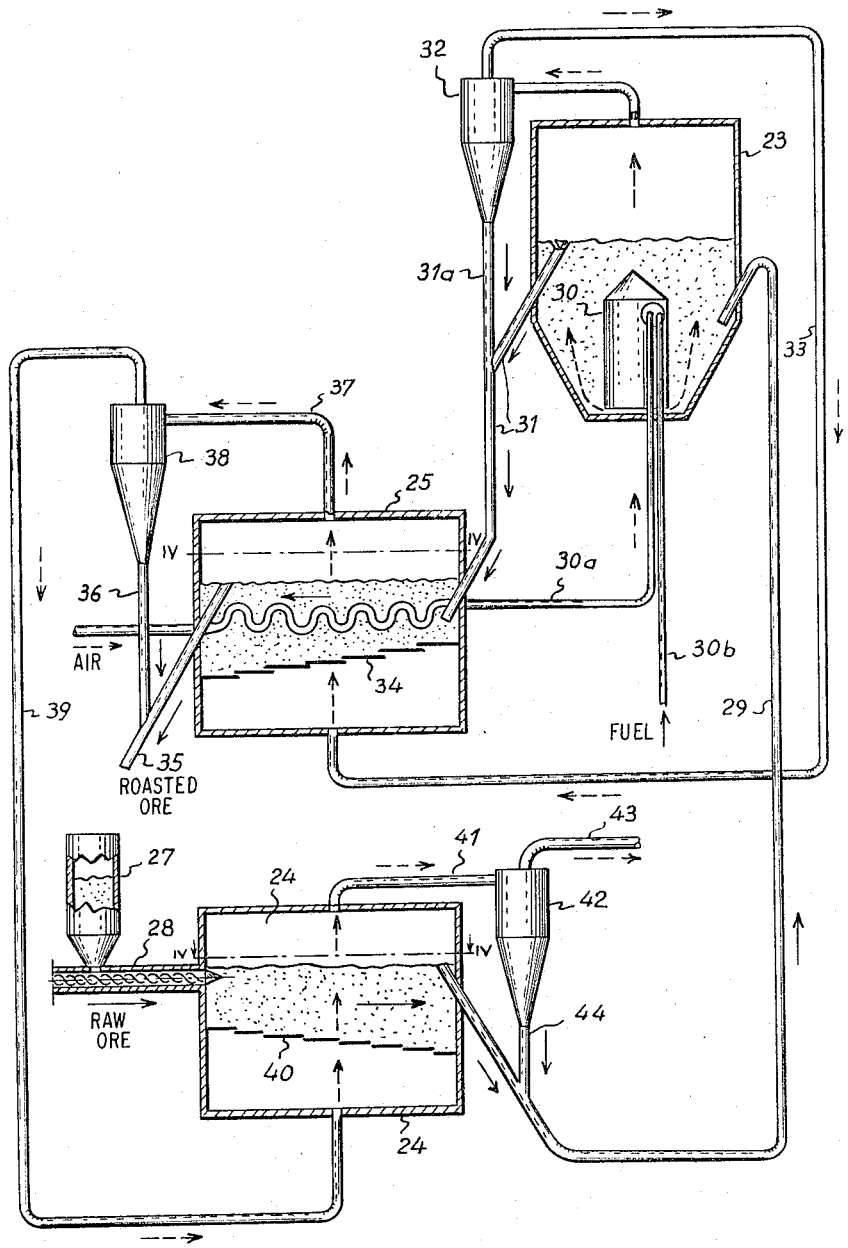

3,299,947
HEAT TRANSFER APPARATUS
Michel Boucraut, Metz, and Imre Toth, Hy-Metz, France, assignors to Institut de Recherches de la Siderurgie Francaise, Saint Germain-en-Laye, France, a French professional institution
Filed May 11, 1964, Ser. No. 366,327
Claims priority, application France, May 14, 1963, 934,749, Patent 1,364,710
9 Claims. (Cl. 165—104)

The present invention concerns an apparatus for transferring the sensible heat of pulverulent materials to cold pulverulent materials.

The known processes and arrangements for effecting such a heat transfer between solid particles rely on conventional heat exchanges which essentially consist of an enclosure traversed by a bundle of tubes. According to the prior art pulverulent materials are fluidized in this enclosure while a stream of gas is passed through the bundle of tubes and carries with it pulverulent materials the temperature of which is different from that of the first mentioned pulverulent materials.

Since heat is conveyed more efficiently between particles of a fluidized mass then between particles transported pneumatically efforts have been made to improve the process of heat exchange between pulverulent materials by fluidizing the materials in the tubes of a heat exchanger. For this purpose the tubes are arranged to extend vertically and the pulverulent materials are introduced into the tubes at their upper ends and a fluidizing gas is introduced into the tubes at their lower ends in such a manner that in each tube a column of fluidized materials is established which is subject to a replacement flow directed in downward direction.

These known systems entail certain disadvantages which are caused necessarily by the use of a bundle of tubes. As a matter of fact, it is very difficult to distribute in an even manner the amounts of materials which pass through these different tubes and the resulting irregularities of distribution result in an incomplete utilization of the active surface area of the heat exchanger. It may even occur, particularly in the case of the second described known method, that a very particular system of flow establishes itself according to which the fluidizing gases pass through certain tubes into which the solid materials do not enter or only to a small degree, while these materials travel rapidly other tubes through which the fluidizing gases do not or almost not pass so that finally even certain tubest may become clogged.

It is therefore an object of this invention to overcome these difficulties and disadvantages and to provide for a system according to which the heat transfer between hot and cold pulverulent materials is effected in a simple and easy manner.

It is another object of this invention to provide for a system as mentioned above in such a manner that the thermal economy of the entire process is improved and whereby the cold materials are treated so as to be heated and are finally delivered at a higher temprature.

With above objects in view, the present invention includes an apparatus for the exchange of heat between fluidized pulverulent materials, comprising, in combination, elongated enclosure means comprising a plurality of compartments separated by partition means extending substantially vertically, each compartment including means for introducing pulverulent material and means for removing the same therefrom; and separate fluidizing means in each of the compartments and including means for passing substantially vertically through a layer of pulverulent material placed in the respective compartment a stream of gas for heating and fluidizing the said material and for conveying the fluidized material lengthwise through the respective compartment toward the means for removing the same therefrom and along the partition means substantially over its entire length, so that heat is transmitted from pulverulent fluidized material in one compartment to pulverulent fluidized material in a neighboring compartment across the partition means between the compartments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a diagrammatic elevation of an arrangement including another embodiment of a heat exchanger according to the invention in connection with a reactor for treating the materials by fluidization;

Figure 1:
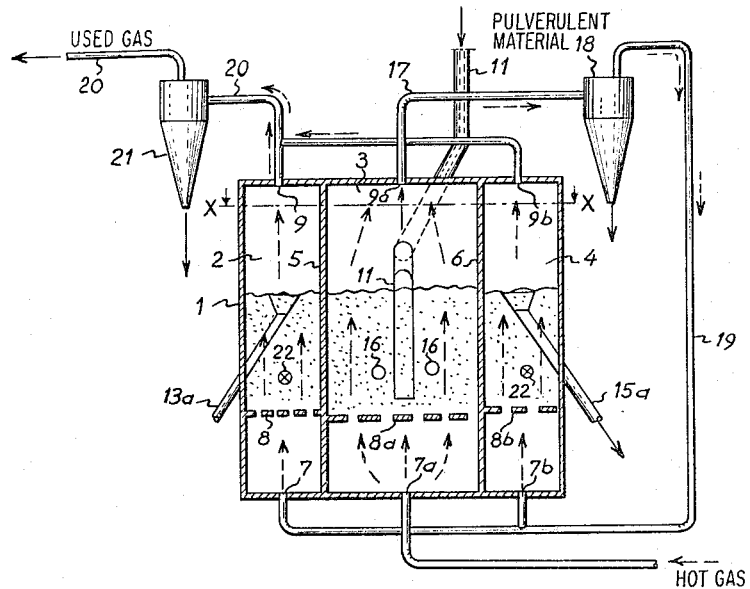
FIG. 1 is a diagrammatic elevation, partly sectioned along line I—I of FIG. 2, of an apparatus according to the invention.
Figure 2:
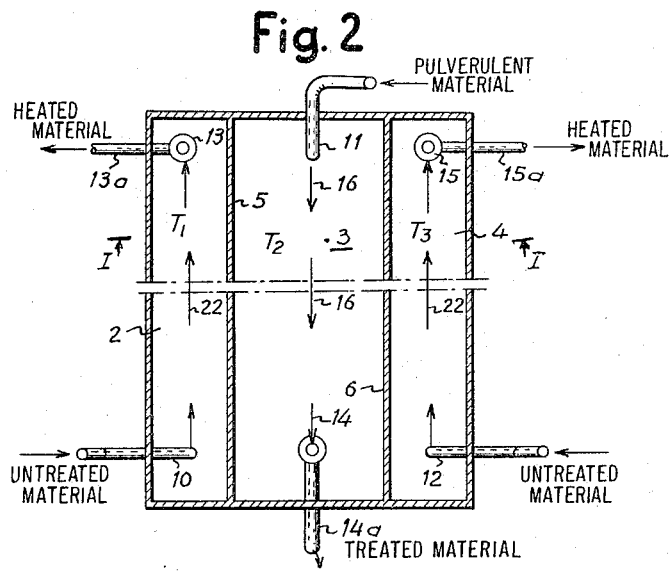
FIG. 2 is a diagrammatic plan view, sectioned along line X—X of FIG. 1.

The embodiment according to FIGS. 1 and 2 comprises a rectangular enclosure 1 having vertical and horizontal outside walls and a rectangular horizontal contour as shown by the sectional plan view of FIG. 2. This enclosure 1 is subdivided into three compartments 2, 3 and 4 by two vertical partitions of sheet metal 5 and 6 extending in vertical direction. Each of these compartments is equipped with means for fluidizing pulverulent material introduced into the respective compartments, namely for the compartment 2 a gas inlet 7, a fluidization grate 8 and a gas exit 9. Analogous elements 7a, 8a and 9a; 7b, 8b, 9b, respectively are provided for the compartments 3 and 4, respectively.

Ducts 10, 11 and 12 for introducing pulverulent materials enter the compartments 2, 3, 4, respectively, near their respective longitudinal ends, but above the grates 8, 8a, and 8b, respectively. At the opposite ends of the individual compartments but at a higher level are arranged the flared orifices 13, 14 and 15, respectively, of the ducts 13a, 14a, 15a, respectively, for removing the pulverulent materials from the respective compartments.

This heat exchanger according to FIGS. 1 and 2 is supplied with hot pulverulent materials, furnished by any type of a plant treating such materials, through a duct 11 which enters the center compartment 3 where these materials are fluidized by a vertical gas stream as indicated by arrows and coming also from the above-mentioned plant of treatment if desired. The pulverulent materials are then delivered to the outside of the apparatus through the duct 14 in such a manner that within the fluidized bed of material in the compartment 3 a general flow of the fluidized material is established which is directed substantially horizontally as indicated by the arrow 16 in FIG. 2.

The fluidizing gases leave the compartment 3 through a duct 17 which is connected to the exit opening 9a and pass thereafter through a centrifugal type dust separator 18 of conventional type and are then taken through a duct 19 to the gas inlets 7 and 7b and thus to the space below the fluidization grates 8 and 8b, respectively, of the compartments 2 and 4 from where these gases are subsequently removed to the outside by means of a duct 20 connected to the exit opening 9 and 9b, respectively, and after passing another dust separator 21.

The cold or untreated pulverulent materials which are to be preheated before their treatment are introduced into the compartments 2 and 4 at the inlets 10 and 12, respectively, whereafter they are fluidized therein and moved horizontally in accordance with the arrows 22 until they reach the orifices 13 and 15, respectively, of the duct 13a, 15a, respectively which may be connected in any desired manner with a certain part of a plant where these preheated materials are to be subjected to further treatment.

It will be understood that the temperature T, in compartment 2 differs from the temperature $T_2$ in compartment 3, and that the temperature $T_3$ in compartment 4 may be, but need not necessarily be, the same as that in compartment 2. The same applies, analogously, to the embodiment shown in FIGS. 3 and 4.

The sensible heat of the fluidized materials which have been introduced at an elevated temperature into the compartment 3 passes through the partitions 5 and 6 into the fluidized beds of material in the compartments 2 and 4 in which the pulverulent materials to be treated move along the partitions in an opposite direction so as to be heated by the heat passing through the partitions, but in addition these materials in the compartments 2 and 4 are heated also by a substantial amount of the sensible heat contained in the gas which serves to fluidize the materials in these compartments.

Figure 4:
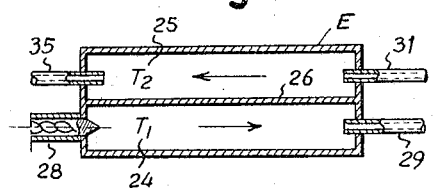
FIG. 4 is a partial plan view of the heat exchanger according to FIG. 3, sectioned along line IV—IV in FIG. 3.

Referring now to FIGS. 3 and 4, it will be seen that the heat exchanger according to the invention is arranged for cooperation with a reactor 23 in which pulverulent ore may be subjected to magnetizing roasting. The actual heat exchanger according to the invention as incorporated in this system comprises an enclosure E subdivided by a partition wall 26 into two compartments 24 and 25 extending in longitudinal direction one next to the other. Only for the sake of the clarity of the illustration these two compartments are shown separated from each other in FIG. 3 but they actually constitute as mentioned above only portions of a unitary enclosure E as is shown clearly by FIG. 4. The partition 26 may be made of sheet metal in order to effect heat transfer from one to the other compartment.

The ore to be treated comes from a reservoir 27. A screw conveyor 28 introduces this pulverulent ore into the compartment 24 of the heat exchanger where the ore is fluidized and preheated whereafter it is conveyed through a duct 29 to the roasting reactor 23. There it is simultaneously fluidized and roasted by hot gases which are furnished by a combustion chamber 30 which is submerged in the bed of materials in the reactor 23. This combustion chamber 30 is supplied with air and fuel by ducts 30a and 30b, respectively, of which one, preferably the air duct 30a extends through the entire compartment 25.

The partially reduced hot ore leaves the reactor 23 through a duct 31 whereby the ore is taken into the compartment 25 of the heat exchanger where it is fluidized by the hot gases coming from the reactor 23. These gases are freed of dust in a dust separator 32 and taken through a conduit or duct 33 to the space below a fluidization grate 34 in the compartment 25. The amounts of dust separated in the separator 32 are re-introduced into the flow of materials by means of a branch duct 31a.

The treated ore, after having given up a considerable part of its sensible heat, is removed from the compartment 25 to the outside by means of an exit duct 35 into which a duct 36 also re-introduces dust which has been carried away with the gases leaving the compartment 25 through duct 37 and separated therefrom in a separator 38. The gases freed of the dust are then taken through a duct 39 to the space below the fluidization grate 40 of the compartment 24 where they transmit a portion of their sensible heat to the ore which they fluidize. These gases are thereafter taken through a duct 41 to another dust separator 42 and released to the outside of 43. A further duct 44 permits to re-introduce the separated dust into the duct 29 and thus into the flow of material.

As can be seen from FIG. 3, the fluidization grates 34 and 40 are constructed as a series of flat members which overlap partly without touching each other. Consequently they constitute an inclined sequence of steps and in order to utilize the present invention it is advisable to arrange these grates in such a manner that their inclination is opposed one to the other and that the inclination be oriented so that its downward direction runs in the same direction as the direction of travel of the pulverulent material resting on these grates, as indicated by the arrows in FIG. 3.

Figure 5:
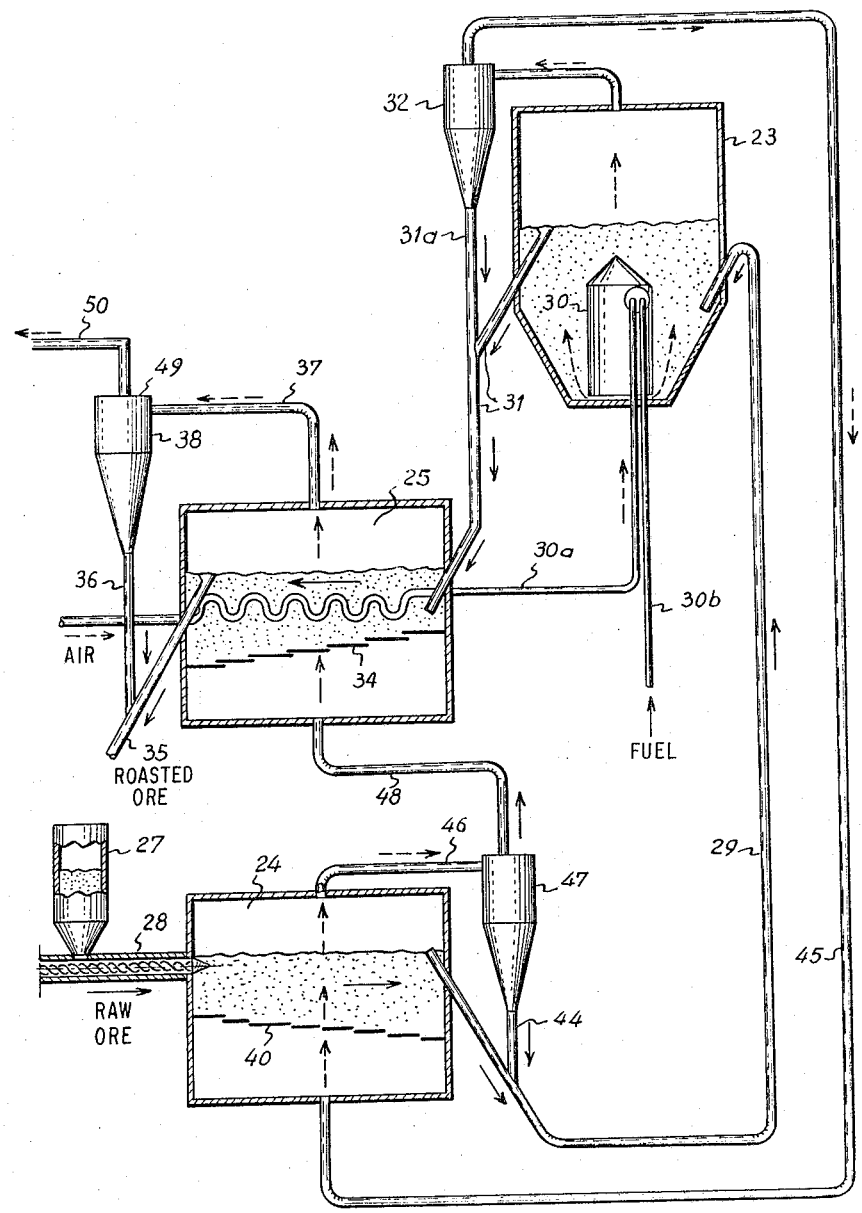
FIG. 5 is a diagrammatic elevation of an arrangement similar to, but modified with respect to, the arrangement according to FIG. 3.

The arrangement according to FIG. 5 is generally of the same type as that illustrated by FIG. 3 and FIG. 4 and may be used for the same purpose. However, the arrangement according to FIG. 5 differs from that according to FIGS. 3 and 4 as far as the circulation of gases is concerned. Upon leaving the reactor 23 and the dust separator 32 the hot gases are first taken through a duct 45 to the space below the grate 40 of the compartment 24 in order to fluidize therein the cold ore. From there a duct 46 takes the gases to a dust separator 47 from where they are taken back through a duct 48 into the heat exchanger and are introduced into the space below the grate 34 in the compartment 25 where these gases fluidize the hot ore coming from the reactor 23 through the duct 31. These gases are thereafter again taken through a dust separator 49 and released through a duct 50. The dust separated in the separator 47 is re-introduced into the circuit by means of a duct 44 connected with the duct 29, and similarly the dust separated in the separator 38 is taken through a duct 36 into the delivery duct 35 of the compartment 25.

It can be seen that in this case the cold ore in the compartment 24 receives somewhat more heat from the fluidizing gas and less heat by heat exchange across the partition 26 because the ore is fluidized in the compartment 25 by these gases after they have passed through the compartment 24, i.e., after they have been cooled therein. As a whole, the ore entering the duct 29 has received in the compartment 24 a few calories less as in the arrangement described previously, but in the outlet duct 50 gases will be available which are somewhat hotter and which thereafter may be used advantageously for drying the raw ore in a crusher or grinder.

In order to clearly show the advantages which are obtainable by the use of the invention, particularly in regard to thermal economy, the following example is given concerning a heat exchanger according to the invention used in a process of magnetizing roasting pure iron ore containing lime.

The following example is based on the assumption that a heat exchanger according to the invention as described with respect to FIGS. 1 and 2 and thus containing three compartments is used in an installation of the type illustrated in FIG. 5. The entire unit has a capacity of handling 10 to 15 tons per hour and the enclosure 1 has a length of 6 meters. The two outer compartments 2 and 4 having a width of 25 cm. and connected in parallel with each other in the system of ducts for receiving the cold ore. The central compartment 3 has a width of 60 cm. and is supplied in the opposite direction with the hot roasted ore which comes from the roasting reactor 23. The height of the fluidized bed or layer in the compartments amounts to about 1 meter.

The heat exchanger effects at the same time the cooling of the fumes of the roasting stage from 650° C. to 350° C. and the cooling of the roasted ore from 650° C. to 300° C. The heat thus recovered is used for preheating the raw ore and the combustion air for the burner or combustion chamber 30. The amount of heat passing through the heat exchanger per ton of raw ore is:

| | Kilogram-calories |
|---|---|
| For the ore | 72,000 |
| For the fumes | 43,000 |
| Total | 115,000 | i.e., at least one million one hundred and fifteen thousand kilogram-calories per hour in total. It has been established by experimentation that the use of a heat exchanger according to the invention in magnetizing roasting has made it possible to arrive at a total heat consumption of 210,000 kilogram-calories per ton in the process of roasting a poor iron ore containing lime as found in Lorraine (France) and containing about 12% of siderite and having the following chemical components: Fe, 30.6%; $SiO_2$ 5.8%; CaO, 19.4%; $Al_2O_3$, 3.9%; $H_2O$, 6.0%; $CO^2$, 17.0%; $Fe^{++}$, 9.4%.

The thermal economy obtained in this manner by the use of a heat exchanger according to the invention is very remarkable and as far as we know has never been attained up to now.

Furthermore, experiments have shown that using the invention as described makes it possible to improve the overall thermal economy of the roasting process at least by 35,000 kilogram-calories per ton of ore as compared with the use of a conventional heat exchanger apparatus having three tiers one above the other, with the added advantage of having a structure of less height, of simpler construction and of simpler operation.

It is to be understood that of course all the outer wall surfaces of the installation and all the ducts have to be thermally insulated carefully in a well known manner in order to arrive at the above favorable figures, i.e. avoiding unnecessary losses of heat. Such thermal insulation has not been shown in the drawings as it does not constitute a part of the invention and would only encumber the illustrations.

It will be understood that each of the elements described above, or two or more together, may also find a useful application in other types of an apparatus for transferring heat between fluidized pulverulent materials, differing from the types described above.

While the invention has been illustrated and described as embodied in an apparatus for transferring heat between fluidized pulverulent materials with the aid of a novel type of heat exchanger, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and described to be secured by Letters Patent is:

1. Apparatus for the heat treatment of pulverulent materials in fluidized condition, comprising, in combination, reactor means for producing hot gas and for thereby heat treating pulverulent material in fluidized condition; elongated enclosure means comprising at least two compartments separated by partition means extending substantially vertically, each compartment including input means for introducing pulverulent material and output means for removing the same therefrom; separate fluidizing means in each of said compartments and including means for passing substantially vertically through a layer of pulverulent material placed in the respective compartment a stream of gas for heating and fluidizing the said material and for conveying the fluidized material through the respective compartment along said partition means and in direction toward said output means; means for feeding cold untreated pulverulent material to said input means of one of said compartments; first duct means for leading fluidized heated material from said output means of said one compartment to said reactor means for further heat treatment; second duct means for leading said further heat treated material from said reactor means to said input means of the other one of said compartments; and third duct means for leading said hot gas after being utilized in said reactor means for heat treating said pulverulent material therein from said reactor means into said compartments for maintaining therein said stream of gas, whereby the cold untreated material introduced into one of said compartments is preheated before it is conveyed to said reactor means.

2. Apparatus for the heat treatment of pulverulent materials in fluidized condition, comprising, in combination, reactor means for producing hot gas and for thereby heat treating pulverulent material in fluidized condition; elongated enclosure means comprising at least two compartments separated by partition means extending substantially vertically, each compartment including input means for introducing pulverulent material and output means for removing the same therefrom; separate fluidizing means in each of said compartments and including means for passing substantially vertically through a layer of pulverulent material placed in the respective compartment a stream of gas for heating and fluidizing the said material and for conveying fluidized material along said partition means through one of said compartments in one predetermined direction toward the output means thereof and through the other of said compartments in an opposite predetermined direction; toward the output means of said other compartment means for feeding cold untreated pulverulent material to said input means of one of said compartments; first duct means for leading fluidized heated material from said output means of said one compartment to said reactor means for further heat treatment; second duct means for leading said further heat treated material from said reactor means to said input means of the other one of said compartments; and third duct means for leading said hot gas after being utilized in said reactor means for heat treating said pulverulent material therein from said reactor means into said compartments for maintaining therein said stream of gas, whereby the cold untreated material introduced into one of said compartments is preheated before it is conveyed to said reactor means.

3. Apparatus for the heat treatment of pulverulent materials in fluidized condition, comprising, in combination, reactor means for producing hot gas and for thereby heat treating pulverulent material in fluidized condition; elongated enclosure means comprising at least two compartments separated by partition means extending substantially vertically, each compartment including input means for introducing pulverulent material and output means for removing the same therefrom; separate fluidizing means in each of said compartments and including means for passing substantially vertically through a layer of pulverulent material placed in the respective compartment a stream of gas for heating and fluidizing the said material and for conveying the fluidized material along said partition means through the respective compartment toward said output means thereof; means for feeding cold untreated pulverulent material to said input means of one of said compartments; first duct means for leading fluidized heated material from said output means of said one compartment to said reactor means for further heat treatment; second duct means for leading said further heat treated material from said reactor means to said input means of the other one of said compartments and third duct means for leading said hot gas after being utilized in said reactor means for heat treating said pulverulent material therein from said reactor means first into one of said compartments and from there into the other one of said compartments for maintaining therein said stream of gas, whereby the cold untreated material introduced into one of said compartments is preheated before it is conveyed to said reactor means.

4. Apparatus for the heat treatment of pulverulent materials in fluidized condition, comprising, in combination, reactor means for producing hot gas and for thereby heat treating pulverulent material in fluidized condition; elongated enclosure means comprising at least two compartments separated by partition means extending substantially vertically, each compartment including input means for introducing pulverulent material and output means for removing the same therefrom; separate fluidizing means in each of said compartments and including means for passing substantially vertically through a layer of pulverulent material placed in the respective compartment a stream of gas for heating and fluidizing the said material and for conveying fluidized material along said partition means through one of said compartments in one predetermined direction toward the output means thereof and through the other of said compartments in an opposite direction; toward the output means of said other compartment; means for feeding cold untreated pulverulent material to said input means of one of said compartments; first duct means for leading fluidized heated material from said output means of said one compartment to said reactor means for further heat treatment; second duct means for leading said further heat treated material from said reactor means to said input means of the other one of said compartments; and third duct means for leading said hot gas after being utilized in said reactor means for heat treating said pulverulent material therein from said reactor means first into one of said compartments and from there into the other one of said compartments for maintaining therein said stream of gas, whereby the cold untreated material introduced into one of said compartments is preheated before it is conveyed to said reactor means.

5. Apparatus for transferring heat between fluidized pulverulent materials, comprising, in combination, elongated enclosure means comprising three adjacent compartments separated by two parallel partition means extending substantially vertically, each compartment including means for introducing pulverulent material and means for removing the same therefrom; said means for introducing material into the outer ones of said three adjacent compartments being connected in parallel; and separate fluidizing means in each of said compartments and including means for passing substantially vertically through a layer of pulverulent material placed in the respective compartment a stream of gas for heating and fluidizing the said material and for conveying fluidized material along said partition means through said outer compartments in one predetermined direction toward the means for removing the material therefrom and through the central one of said compartments in an opposite predetermined direction, so that a pulverulent fluidized material of higher temperature in one compartment exchanges heat with a pulverulent fluidized material of lower temperature in an adjoining compartment through the intermediary of the partition means between such compartments.

6. Apparatus for transferring heat between pulverulent materials which are to be maintained out of contact, said apparatus comprising enclosure means; thermally conductive fluid-tight partition means provided in and subdividing the interior of said enclosure means into at least two adjacent compartments; feed means communicating with said enclosure means for introducing pulverulent materials into said compartments; withdrawing means communicating with the individual compartments spaced from said feed means for receiving fluidized material therefrom; and fluidizing means operatively connected with said enclosure means and including means for passing a gas through the pulverulent material in at least one of said compartments for fluidizing said material therein and for causing the thus fluidized material to flow in said one compartment toward the respective withdrawing means along said partition means, and means for passing a gas through the pulverulent material in the other compartment for fluidizing the material therein and causing the thus fluidized material to flow toward the respective withdrawing means and along said partition means in counterflow to the material in said one compartment, whereby said thus fluidized materials exchange heat with one another through the intermediary of said thermally conductive partition means when the two fluidized materials in said compartments are at different temperatures.

7. Apparatus as defined in claim 6, wherein said means for passing said gas through said materials comprises inlet means communicating with a bottom portion of at least one of said compartments so that the gas will rise upwardly therein; and further comprising transfer means for transferring said gas from the top portion of said last mentioned compartment to the bottom portion of the other compartment.

8. Apparatus as defined in claim 6, wherein said partition means is substantially vertical and the respective materials in said compartments flow along said partition means in substantially horizontal direction over substantially the entire length of said partition means.

9. Apparatus as defined in claim 8, wherein said compartments each have opposite ends, said feed means comprising independent admission means communicating with the respective compartments adjacent one of said ends thereof, and said withdrawing means communicating with said compartments adjacent the respective other ends thereof; and wherein said means for passing gas through the respective compartments are separate and respectively communicate with one of said compartments.

References Cited by the Examiner

UNITED STATES PATENTS 2,782,019    2/1957    Turney et al. _____ 165—104 X

FOREIGN PATENTS 1,098,520    3/1955    France.
1,330,230    5/1963    France.

MEYER PERLIN, *Primary Examiner*

ROBERT A. O'LEARY, *Examiner.*

N. R. WILSON, A. W. DAVIS, JR., *Assistant Examiners.*